United States Patent [19]
Kenny

[11] 4,313,561
[45] Feb. 2, 1982

[54] TEMPERATURE CONTROL SYSTEM AND THERMALLY RESPONSIVE ELECTRO-VACUUM RELAY THEREFOR

[75] Inventor: Andrew A. Kenny, Roselle, Ill.

[73] Assignee: Eaton Corporation, Cleveland, Ohio

[21] Appl. No.: 144,794

[22] Filed: Apr. 28, 1980

[51] Int. Cl.$^3$ .............................................. B60H 1/12
[52] U.S. Cl. ................................ 237/12.3 A; 236/84; 236/86
[58] Field of Search ..................... 236/84, 86, 87, 100; 165/25, 43; 337/1; 237/12.3 A

[56] References Cited

U.S. PATENT DOCUMENTS

| | | | |
|---|---|---|---|
| 3,263,739 | 8/1966 | Gaskill et al. | 165/25 X |
| 3,300,619 | 1/1967 | Nilssen | 237/12.3 B X |
| 3,498,332 | 3/1970 | Lybrook | 236/86 X |
| 3,498,538 | 3/1970 | Mitchell | 236/86 X |
| 3,907,199 | 9/1975 | Kreger | 237/12.3 B |
| 4,065,052 | 12/1977 | Ridenour | 236/86 |
| 4,176,784 | 12/1979 | Ridenour | 236/86 |

*Primary Examiner*—William E. Tapolcai, Jr.
*Attorney, Agent, or Firm*—R. J. McCloskey; R. A. Johnston

[57] ABSTRACT

An electro-vacuum relay 10 is disclosed comprising a thermally responsive actuator 18 mounted on the lower end of a housing 14, 16 which defines a vent chamber 66. Upper and lower fluid ports 38, 40 are integrally molded into the housing and communicate with vent chamber 66. A pair of electrical terminals 22 and 24 include tab portions 30, 32 which extend through housing cover 16 and into the vent chamber. A carrier member 68 is movable in the vent chamber and has reacting against its upper end a compression biasing spring 88 and against its lower end an output member 64 of thermal actuator 18. A rectangularly shaped elastomeric valve member 72 is mounted in an opening 74 in the carrier and has an upwardly extending double beaded sealing surface 76 around its periphery that engages with a valve surface formed by an inner wall portion 42 of main housing 14. An electrical contact member 80 is received in another opening formed in carrier 68 and is spring biased outwardly toward tab portions 30, 32 by a spring 82 which also functions to seat the valve member against inner wall portion 42.

27 Claims, 6 Drawing Figures

TEMPERATURE CONTROL SYSTEM AND THERMALLY RESPONSIVE ELECTRO-VACUUM RELAY THEREFOR

BACKGROUND OF THE INVENTION

This invention relates to systems for controlling ambient air flow into a vehicle passenger compartment and also to thermally responsive devices which perform pneumatic valving and electrical switching functions.

DESCRIPTION OF THE PRIOR ART

In passenger vehicle heating and cooling systems it is known to provide a temperature control system which prevents cold ambient air from entering the passenger compartment prior to the engine reaching its normal operating temperature. These known systems commonly incorporate temperature responsive bimetal actuated electrical switches for controlling a solenoid operated vacuum relay which in turn controls a vacuum operated motor connected to a plenum door positioned in the path of incoming ambient air. Performance problems have been encountered with this type arrangement as a result of chattering of the bimetal switch which is caused by a reduction in contact pressure as the engine reaches normal operating temperature. The chattering of the bimetal switch results in chattering of the solenoid, unacceptable noise levels, and accelerated relay contact deterioration.

It has been found that solenoid chatter is caused periodically by electrical feedback from adjacent electronic control components, thus further aggravating the noise and contact wear problems.

Furthermore, in such known arrangements, described above, the electrical contacts of the relay commonly employed are of the "open and closed" type and have a tendency toward contamination build-up over an extended period of time often resulting in an open circuit condition when the contacts are closed.

Thus, a need has arisen for a more reliable, lower cost alternative system and device for controlling ambient air flow to a vehicle passenger compartment during periods of engine warm-up.

SUMMARY OF THE INVENTION

In the present invention an electro-vacuum relay is provided which performs both a pneumatic valving and an electrical switching function in response to operation by a thermally sensitive actuator. The thermal actuator has a temperature sensitive portion extending from the lower end of a valve housing for sensing a temperature to be monitored as, for example, engine coolant temperature. An actuator output member extends into an elongated control chamber which is vented to the atmosphere. A filter element mounted in the housing prevents contaminants from entering the fluid chamber of the valve. The actuator output member is operatively contacted by a carrier member contained within the fluid chamber.

A generally rectangularly shaped elastomeric valve member is mounted in an opening in the carrier and has a peripheral valve sealing surface which is in sealing engagement with a flat internal wall surface portion of the valve housing. A cavity is provided in the surface of the valve member and forms in cooperation with the internal wall of the housing a movable valving chamber.

Inlet and outlet fluid ports are formed on one side wall of the valve housing and are in fluid communication with the vented chamber respectively by openings through the flat internal wall surface. In a first valving position the valve surface of the valve member surrounds the orifices of the first and second fluid ports thereby placing the ports in communication with each other. As temperatures are sensed above a predetermined value the thermal actuator moves the carrier and the valve member upwardly such that the movable valving chamber surrounds only one of the fluid ports, thereby fluidly isolating the first and second fluid ports.

A pair of electrical contacts extend through the housing into the fluid chamber and are placed in either an open or closed position by a sliding switch contact member which is connected to the carrier member. The switch member is positioned on the carrier member such that the valving and switching functions occur in a predetermined sequence. The sliding action of the switch contact member against the terminal contact surfaces wipes contaminants from these surfaces.

A biasing spring is positioned intermediate the switch contact member and the carrier member and performs the dual function of maintaining the valve member seated against the flat portion of the internal wall surface and biasing the contact member toward the terminal contacts.

The aforementioned valving and switching arrangement allows the biasing spring to simultaneously compensate for wear of both the valve member and switch contact, thus prolonging the useful life of the device.

The invention includes a system which incorporates the device described above in cooperation with an electrical power source, an electrically driven blower for forcing air through an air inlet duct, a vacuum-spring operated motor which actuates a flapper door in the path of the duct, and a source of vacuum for operating the vacuum motor.

It is therefore an object of the invention to provide a device which performs both a pneumatic valving and an electrical switching function at low cost and with a minimum number of component parts.

It is another object of the invention to provide a device which is not subject to chatter as caused by sensitivity of a bimetal switch actuator or electrical feedback from associated engine control components.

It is an object of the invention to provide a pneumatic valving and electrical switching arrangement which compensates for both valving member and electrical contact member wear.

It is still another object of the invention to provide a system for controlling ambient air flow to a passenger vehicle compartment. The system will be responsive to engine cooling system fluid temperature.

These and other objects, features and advantages of the present invention will be understood in greater detail from the following description and the associated drawings which are utilized in illustrating the presently preferred embodiment of the invention.

BRIEF DESCRIPTIONS OF THE DRAWINGS

Figure 1:
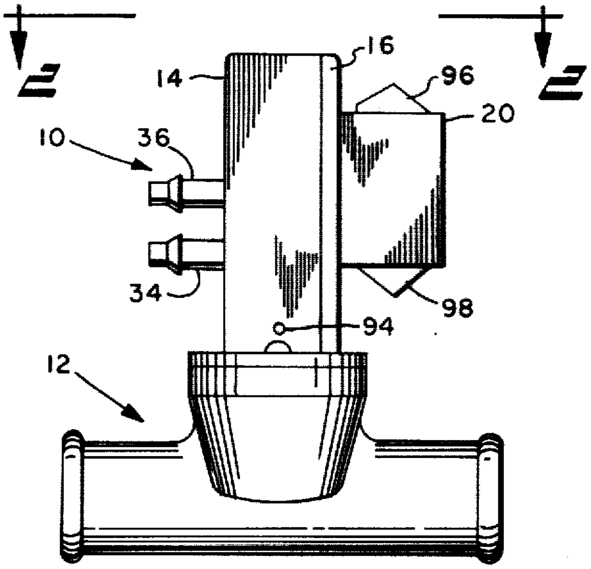
FIG. 1 is a view in elevation of the preferred embodiment of the present invention mounted to an engine heater hose adapter.
Figure 3:
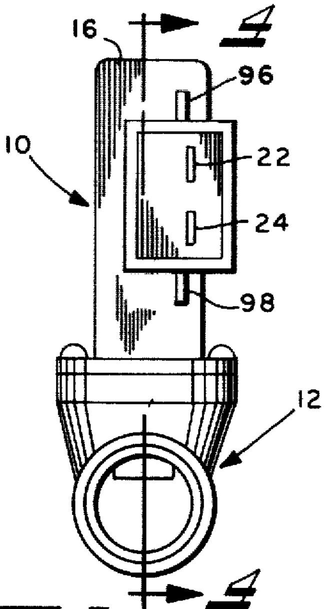
FIG. 3 is a side view in elevation taken relative to FIG. 1.
Figure 2:
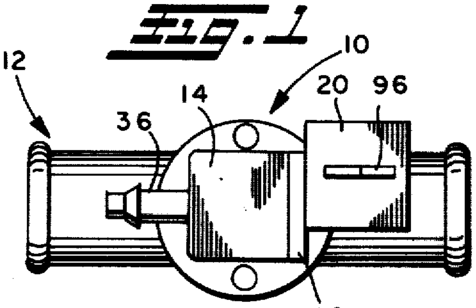
FIG. 2 is a top view in elevation taken relative to FIG. 1.
Figure 5:
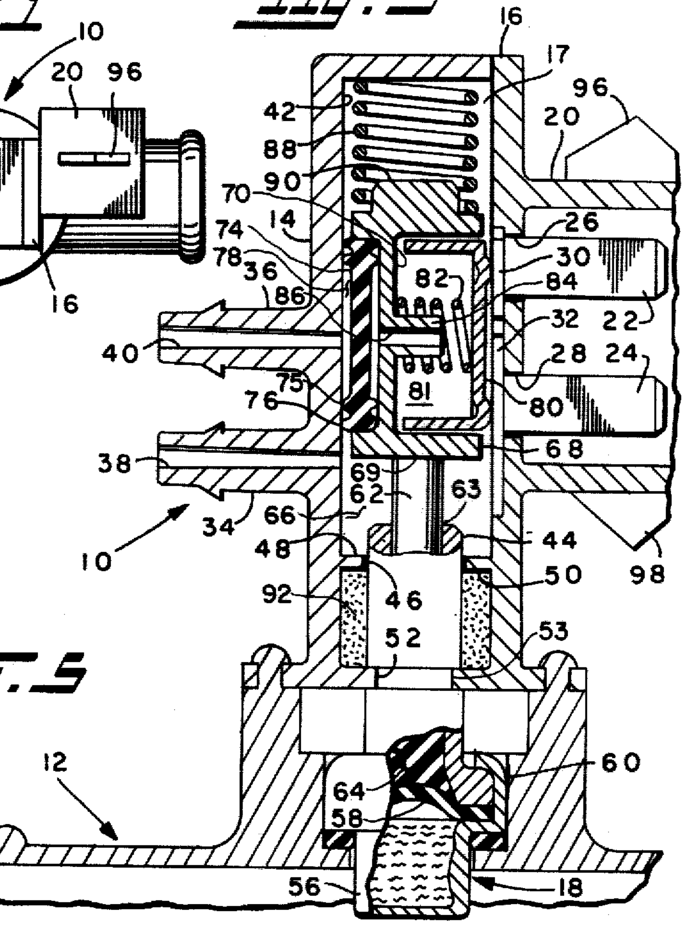
Figure 4:
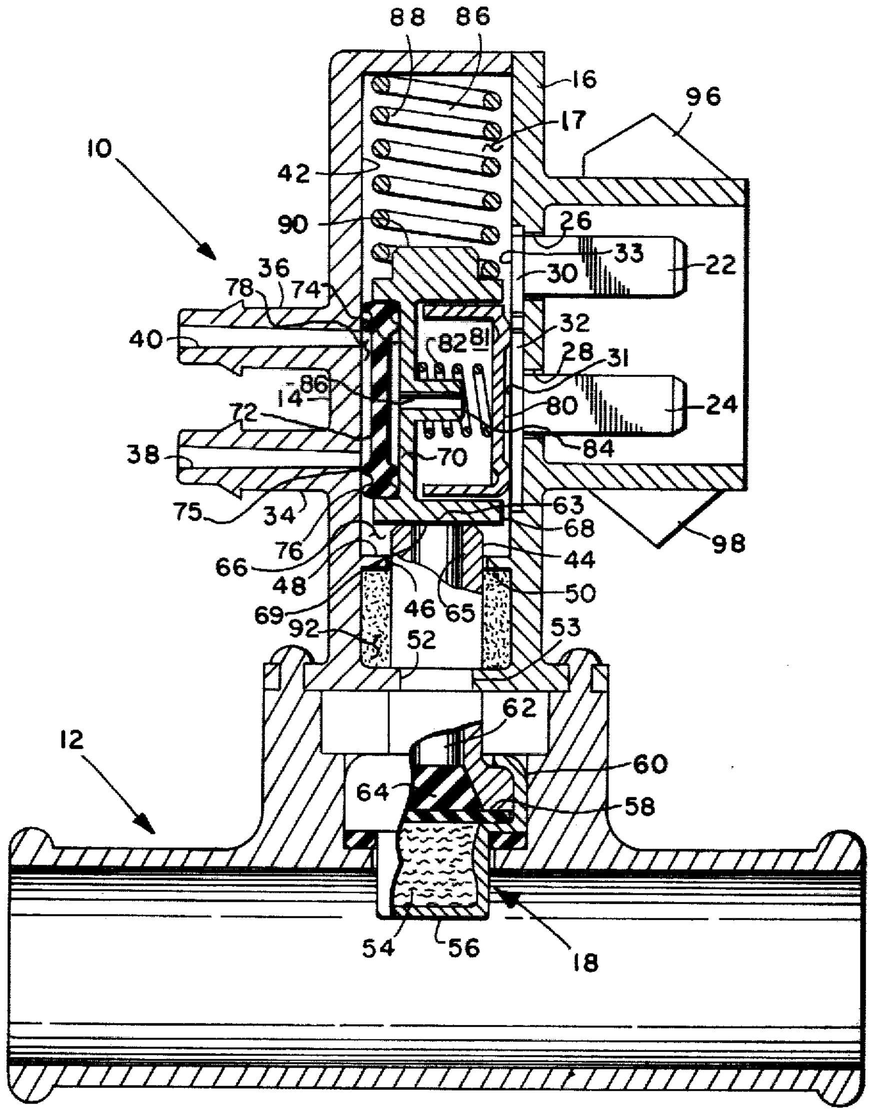
FIG. 4 is a cross-sectional view taken through section lines 4—4 of FIG. 3 illustrating the embodiment of FIG. 1 in the first position as the thermal element senses temperatures below a predetermined level.
Figure 6:
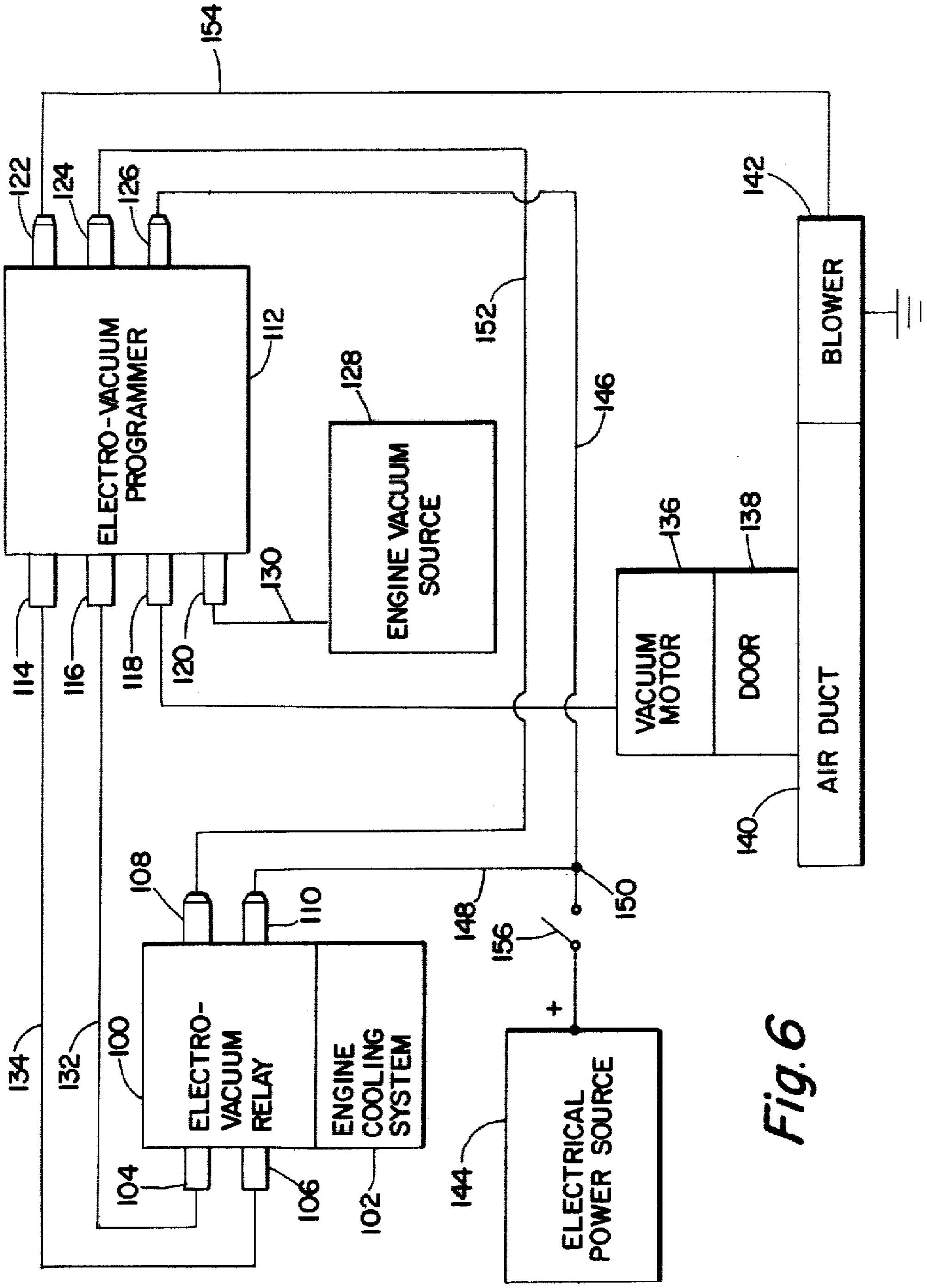

FIG. 5 is a cross-sectional view similar to FIG. 2 illustrating the embodiment of FIG. 1 in the second position as the thermal element senses temperatures at or above the predetermined level of the position illustrated in FIG. 4; and FIG. 6 is a block diagram of a system according to the invention which controls ambient air flow into a vehicle passenger compartment in response to sensing engine cooling system fluid temperature.

DETAILED DESCRIPTION

Referring now to FIGS. 1 through 5, a thermally responsive electro-vacuum relay, indicated generally by reference numeral 10, is shown mounted in association with a heater hose adapter, indicated generally at 12. Relay 10 includes a thermally responsive actuator, indicated generally at 18, extending from the lower end of a rectangularly shaped main housing 14.

A housing cover portion 16 is connected to the right side of main housing 14 and has provided therein a box-shaped extension 20. The internal surfaces of the main housing and cover define a rectangularly shaped cavity 17.

A pair of electrical terminals 22 and 24 extend through openings 26 and 28, respectively in cover 16 and have end portions surrounded by extension 20 thereof. Tabs 30 and 32 (seen edgewise in FIG. 4) are right angle bend portions of terminals 22 and 24, respectively, and define switch contact surfaces 31 and 33 within cavity 17.

Main housing 14 has formed on the left side thereof as viewed in FIG. 4 lower and upper nipples 34 and 36 which have formed therein first and second fluid ports 38 and 40, respectively. Fluid ports 38 and 40 open into an internal, flat wall portion 42 formed by main housing 14. Wall portion 42 also functions as a valve seating surface.

Main housing 14 and cover portion 16 are in the preferred form of the invention molded from a temperature resistant plastic or other suitable material.

Thermal actuator 18 includes an upper guide casing 44 which extends through and is guided by a first opening 46 formed by end surfaces of transverse rib portions 48 and 50 of housing 14 and cover 16 and an opening 52 formed through the lower end of housing 14. An annular groove 53 is formed in guide casing 44 and has upper and lower shoulders which overlap opening 52 for limiting axial movement of the actuator and connecting it to the housing.

Thermal actuator 18 is preferably of a type well known in the art and has a thermally responsive, expansible wax compound 54 disposed within a retaining cup 56. The wax compound is sealed in the cup by a flexible diaphragm 58 which is clamped thereon by the bottom surface of the guide casing. An output rod 62 extends through an opening 63 in the guide casing and had its lower end reacting against an elastomeric plug 64 which is located intermediate the upper surface of the diaphragm and the lower end of the rod. It will be understood, however, that thermal actuators other than the wax type may be employed.

An elongated carrier member 68 has a generally rectangular tubular configuration and is received and movable within cavity 17. A lower flat surface portion 69 on carrier 68 is in abutment with an upper end portion of output rod 62. A longitudinal rib 70 extends across the side walls of the carrier. A rectangularly shaped elastomeric valve member 72 is received in a left side opening 74 in the carrier formed by the left surface of rib 70 and the internal side walls of the carrier. A valve surface is defined by adjacent ribs 75, 76 formed around both the left and right faces of the valve member to insure foolproof assembly. The spacing between ribs 75, 76 is sized to exceed the transverse dimension of the opening of fluid port 38 at internal wall 42. The double sealing surfaces prevent atmospheric venting of fluid port 40 during upward movement of valve member 72. The thickness of the valve member across the sealing ribs is sized sufficiently greater than the depth of the opening in the carrier to compensate for valve member wear as it slides against the surface of wall 42.

The longitudinal spacing between the upper and lower valve surface portions 76 is sized to extend beyond the outer edges of the openings of ports 38, 40 such that in the FIG. 4 position the ports are maintained in fluid communication.

A movable valve chamber 78 is defined by the space bounded by the surface of valve member 72 within valve surface 76 and that portion of internal wall 42 covered thereby.

An electrical contact member 80 is received in an opening 81 on the right side of carrier 68 and is biased toward switch surfaces 31 and 33 by a compression spring 82. A cylindrical boss 84 extends from the right face of rib 70 and functions to guide spring 82. An opening 86 in boss 84 allows venting of atmospheric air to the right surface of valve member 72.

A compression return spring 88 has its upper end reacting against main housing 14 and its lower end guided by a cylindrical boss portion 90 formed on carrier 68. As is known in the art, a compression spring is required to return the output rod of the thermal actuator to its fully retracted position.

A porous filter element 92 is mounted in the lower end of cavity 66 beneath ribs 48 and 50 and surrounds the upper guide casing portion of thermal actuator 18. A vent hole 94 as shown by FIG. 1 extends through the lower side wall of main housing 14 and permits entry of atmospheric air to vent chamber 66.

As shown in FIG. 1, locking tabs 96 and 98 are formed on cover extension 20 to facilitate connection to an appropriate connector.

In operation, as temperatures are sensed below a certain predetermined value, return spring 88 maintains a downward load on carrier 68 sufficient to place it in what is designated as a first position in which the lower and upper fluid ports are placed in fluid communication through movable valve chamber 78. In the first position switch contact member 80 is spaced below contact surface 31, thus placing terminals 22 and 24 in an open circuit condition.

As temperatures are sensed by thermal actuator 18 above the aforementioned predetermined value, output member 44 moves carrier 68 to the position as shown by FIG. 5 in which lower fluid port 38 is now vented and fluidly isolated from upper fluid port 40 and terminals 22 and 24 are electrically connected. Prior to actuation of the device, lower fluid port 38 was maintained in fluid communication with the upper fluid port 40 which is in turn connected to a vacuum source (not shown).

Carrier member 68 is free to slide transversely relative to the actuator output rod. As relay 10 is cycled between the first and second positions, spring 82 maintains valve member 72 and contact member 80 biased toward surface 42 and surfaces 31, 33, respectively, thus adjusting the position of the carrier for any wear which may take place at those surfaces.

Referring now to FIG. 6, there is illustrated schematically a system according to the present invention for controlling fresh air flow to a vehicle passenger compartment in response to the temperature of the engine cooling system fluid. The system includes an electrovacuum relay (EVR) 100 similar in construction and function to that shown at 10 above and which has a temperature sensitive portion in heat transfer relationship with the fluid in an engine cooling system indicated at 102. EVR 100 includes a vacuum port 104 and a vent port 106 which correspond to ports 40 and 38 respectively of FIG. 4 and electrical terminals 108 and 110 which correspond to terminals 22 and 24, respectively, of FIG. 4.

The system is shown in association with an electrovacuum programmer 112 which is of a type well known in the art and generally comprises a slider member having a pattern of passageways formed on one side and switch contacts on the other side. The slider member engages with passageways formed in the programmer body and a printed circuit on another portion of the body and functions to valve and switch fluid ports and electrical terminals. Programmer 112 includes fluid ports 114, 116, 118, and 120, and also electrical terminals 122, 124, and 126.

An engine vacuum source 128 is connected to port 120 by a fluid conduit 130 thereby supplying the vacuum source to electrovacuum programmer 112. Fluid line 132 connects ports 104 and 116. Fluid line 134 connects ports 106 and 114.

Vacuum motor 136 is of the known type having a spring loaded diaphragm plate actuated by changing pressure within a vacuum chamber. The output of motor 136 is connected to a damper door 138 which is pivotally mounted in the path of air flow through an air intake duct 140. Door 138 is movable between an open and shut position for controlling air flow through the duct as forced therethrough by an electrically driven blower 142.

An electrical power source 144 is connected by lead 146 to terminal 126 and by lead 148 to terminal 110 at junction 150. Lead 152 connects terminals 108 and 124. Lead 154 connects terminal 122 to blower 142. An ignition switch 156 is positioned between electrical power source 144 and junction 150.

In operation, as ignition switch 156 is closed electrical power is supplied through portions of the circuit of FIG. 6 and vacuum is supplied to port 120 of programmer 112 by the engine vacuum source. Electro-vacuum relay 100 senses the temperature of the engine cooling system fluid and if that temperature is below a predetermined value, then the relay is moved to a position as shown by FIG. 4 in which a vacuum signal is transferred from programmer 112, through line 132 to port 104 where it enters relay 100 and is communicated through port 106 in a return path through line 134 to port 114 of the programmer 112. The vacuum signal is communicated through certain passageways in the programmer (not shown) to port 118, through line 119 and then to vacuum motor 136. With vacuum supplied to motor 136, door 138 is moved to a closed position within air duct 140, thus preventing air flow therethrough. At the same time, terminals 108 and 110 of relay 100 are placed in an open position thereby preventing the transfer of electrical power from terminal 108 to terminal 124 of the programmer and then to blower 142. It should be noted that programmer 112 is preferably of the type which permits override of relay 100 if the vehicle operator places the vehicle heating and cooling system in the "defrost" or "defog" mode in which case a flow of outside air to the passenger compartment is required. It should be noted that programmers of the type described above form part of a semiautomatic or automatic temperature control system. It will be understood, however, that the system of the present invention may alternatively also be used in connection with a manually controlled system in which the engine vacuum source 128 is connected directly to fluid port 104. This manual arrangement allows selective opening of door 138 and energization of blower 142 prior to the engine cooling system temperature rising above a predetermined minimum.

If relay 100 is not overridden and engine cooling system temperatures are sensed above a predetermined minimum value, relay 100 will move to the position shown by FIG. 5 in which port 106 and line 134 are vented to the atmosphere. The venting is communicated through programmer 112 to port 118, through line 119 to vacuum motor 136. The bias spring in vacuum motor 136 moves door 138 to an open position thus permitting air flow through air duct 140. Simultaneously, a voltage is applied to blower 142 by reason of closing a circuit between terminals 110 and 108.

The embodiments of the inventions as shown and described above are representative of the inventive principles stated therein. It will be understood, however, that variations and departures therefrom can be made without departing from the scope of the invention as set forth in the appended claims.

What is claimed is:

1. A thermally responsive device for valving a plurality of fluid ports and performing an electrical switching function, said device comprising:
   (a) housing means, said housing means including structure defining
      (i) a vent chamber having an internal wall portion defining a valve seat,
      (ii) a first fluid port in fluid communication with said vent chamber and opening into said wall portion,
      (iii) a second fluid port in fluid communication with said vent chamber and opening into said wall portion, said first fluid port being disposed in spaced arrangement from said second fluid port,
      (iv) means for venting said vent chamber to the atmosphere;
   (b) a carrier member received in said vent chamber and movable between a first and second position;
   (c) thermally responsive actuator means associated with said housing means and operative to move said carrier member from said first to said second position;
   (d) valve means operably connected to said carrier member and movable therewith, said valve means including a member having resilient valve surface portions defining in co-operation with said internal wall portion a movable valve chamber therebetween, wherein said first and second fluid ports are spaced such that upon movement of said carrier to said first position said first and second ports are in mutual communication and isolated from said vent chamber and in said second position said first port communicates with said vent chamber and said second port is isolated from said first port and said vent chamber;

(e) electrical switch means, said switch means including (i) contact means mounted on said carrier member and movable therewith, (ii) a pair of spaced, stationary terminals connected to said housing means (iii) said contact means operatively having an actuated condition completing a circuit between said first and second terminals and an unactuated condition breaking a circuit between said terminals;

(f) means for commonly biasing said valve means towards said valve seat and said contact means toward said contact surface portions;

(g) said thermally responsive actuator means being operative to move said carrier member between a first position as temperatures are sensed below a predetermined value in which first position said contact member is in said unactuated condition, and a second position as temperatures are sensed above said predetermined value in which said contact portion is in said actuated condition.

2. The device as defined in claim 1, wherein said pair of spaced stationary terminals each have contact surface portions extending within said vent chamber.

3. The device as defined in claim 1, wherein said internal wall portion is flat.

4. The device as defined in claim 1, wherein said valve surface portion is defined by first and second adjacent bead portions extending outwardly from and surrounding said cavity, said bead portions having a spacing greater than the transverse dimension of said second fluid port at said internal wall portion.

5. The device as defined in claim 1, further including filter means disposed intermediate said vent means and said vent chamber.

6. The device as defined in claim 1, wherein said carrier member has first and second oppositely disposed cavities opening in a direction transverse to a longitudinal axis through said carrier member, said valve means disposed within said first cavity and said contact means movable within said second cavity.

7. The device as defined in claim 6, wherein said carrier member has a web portion intermediate said first and second cavities and a vent passageway through said web portion for communicating atmospheric air intermediate said valve means and said web portion.

8. The device as defined in claim 1, wherein said biasing means includes a spring having one end thereof reacting against said carrier member and the other end thereof reacting against said contact member.

9. The device as defined in claim 1, wherein said housing means includes, (a) a main housing portion having an elongated rectangularly shaped opening therein; and (b) a cover portion having a generally flat configuration disposed over the opening in said main housing portion, said main housing portion and said cover portion defining said elongated vent chamber.

10. The device as defined in claim 9, wherein (a) said main housing portion includes an end wall portion and a transversely extending rib portion spaced axially from said end wall portion;

(b) said cover portion having a transversely extending end wall portion aligned with said main housing end wall and a transversely extending rib portion aligned with said main housing rib portion;

(c) said end wall portions defining a first guide opening therebetween;

(d) said rib portions defining a second guide opening therebetween; and (e) said thermally responsive means including an upper portion extending through and guided by said second opening and further including an annular groove having upper and lower shoulder portions which overlap said first opening such that said thermally responsive means is mounted to said housing means.

11. The device as defined in claim 1, wherein said thermally responsive means includes a temperature sensitive portion extending exteriorly of said housing means.

12. A device for valving a plurality of fluid ports and performing an electrical switching function, said device comprising;

(a) housing means, said housing means including structure defining (i) a vent chamber having an internal wall surface portion, said internal wall portion defining a valve seat, (ii) a first fluid port in fluid communication with said vent chamber and opening into said wall portion, (iii) a second fluid port in fluid communication with said vent chamber and opening into said wall portion, said first fluid port being disposed in spaced arrangement from said second fluid port, (iv) means for venting said vent chamber to the atmosphere; (b) a carrier member received in said vent chamber and movable therein between a first and second position;

(c) actuator means associated with said housing means, said actuator means including an output member operative to move said carrier member from said first to said second position;

(d) valve means operably connected to said carrier member and movable therewith, said valve means including a member having (i) flexible surface portions defining (ii) a valving surface cooperating with said internal wall portion to define a movable valve chamber therebetween, such that said first and second fluid ports are in mutual fluid communication and isolated from said vent chamber when said carrier is in said second position and said first port is isolated from said vent chamber and said second port when said carrier is in said first position; and (e) electrical switch means, said switch means including (i) contact means mounted on said carrier member and movable therewith, (ii) a pair of spaced, stationary terminals connected to said housing means, (iii) said contact means having an actuated condition completing a circuit between said terminals and an unactuated condition breaking the circuit between said terminals;

(f) means for biasing said valve means toward said valve seat and said contact means toward said contact surface portions, said bias being in a direction transversely relative to movement of said carrier;

(g) said actuator means moving said carrier member between said first position in which said contact member is in said unactuated condition, and a second position in which said contact portion is in said actuated condition.

13. The device as defined in claim 12, wherein said pair of spaced, stationary terminals each have contact surface portions extending within said vent chamber.

14. The device as defined in claim 12, wherein (a) said actuator means output member is an elongated rod having an upper end portion;

(b) said carrier member has a lower surface portion; and (c) further including means for biasing said carrier member toward said output member such that said carrier member lower surface portion is maintained in abutment with said upper end portion of said output member, said carrier member movable transversely relative said output member as urged by said valve means biasing.

15. The device as defined in claim 12, wherein said internal wall portion is flat.

16. The device as defined in claim 12, wherein said valve surface portion is defined by first and second adjacent beads extending outwardly from and surrounding said cavity, said first and second beads spaced greater than the transverse dimension of said second fluid port at said internal wall portion.

17. The device as defined in claim 12, further including filter means disposed intermediate said vent means and said vent chamber.

18. The device as defined in claim 12, wherein said carrier member has first and second oppositely disposed cavities opening in a direction transverse to a longitudinal axis through said carrier member, said flexible member disposed within said first cavity and said contact means movable within said second cavity.

19. The device as defined in claim 18, wherein said carrier member has a web portion intermediate said first and second cavities and a vent passageway through said web portion for communicating atmospheric air intermediate said flexible valve member and said web portion.

20. The device as defined in claim 12, wherein said biasing means includes a spring having one end thereof reacting against said carrier member and the other end thereof reacting against said contact member.

21. The device as defined in claim 12, wherein said housing means includes, (a) a main housing portion having an elongated rectangularly shaped opening therein; and (b) a cover portion having a generally flat configuration disposed over the opening in said main housing portion, said main housing portion and said cover portion defining said elongated vent chamber.

22. The device as defined in claim 21, wherein (a) said main housing portion includes an end wall portion and a transversely extending rib portion spaced axially from said end wall portion;

(b) said cover portion having a transversely extending end wall portion aligned with said main housing end wall and a transversely extending rib portion aligned with said main housing rib portion;

(c) said end wall portions defining a first guide opening therebetween;

(d) said rib portions defining a second guide opening therebetween; and (e) said thermally responsive means including an upper portion extending through and guided by said second opening and further including an annular groove having upper and lower shoulder portions which overlap said first opening such that said thermally responsive means is mounted to said housing means.

23. The device as defined in claim 12, wherein said thermally responsive means includes a temperature sensitive portion extending exteriorly of said housing means.

24. A system for controlling ambient air flow in a passenger vehicle intake air duct, said vehicle having a fluid cooling system, an air intake duct, a shut-off door positionable in the flow of air through said duct, said door movable between an open and closed position, a low pressure source, and an electrical power source, said system comprising:

(a) blower means for forcing ambient air through said duct, said blower means including an electric motor for driving same;

(b) relay means, said relay means including, (i) housing means, said housing means having structure defining a vent chamber and an internal wall portion in fluid communication with said vent chamber, said internal wall portion defining a valve seat, said housing means having a first fluid port in fluid communication with said vent chamber and opening into said wall portion, a second fluid port in fluid communication with said vent chamber and opening into said wall portion, said first fluid port being disposed in spaced arrangement from said second fluid port, said housing means including means for venting said vent chamber to the atmosphere, (ii) a carrier member received in said vent chamber and movable between a first and second position, (iii) thermally responsive actuator means associated with said housing means and operative to move said carrier member from said first to said second position, said actuator means having a temperature sensitive portion in heat transfer relationship with said fluid cooling system, (iv) valve means operably connected to said carrier member and movable therewith, said valve means including a member having resilient valve surface portions defining in co-operation with said internal wall portion a movable valve chamber therebetween, wherein said first and second fluid ports are spaced such that upon movement of said carrier to said first position said first and second ports are in mutual communication and isolated from said vent chamber and in said second position said first port communicates with said vent chamber and said second port is isolated from said first port and said vent chamber, (v) electrical switch means, said switch means including contact means mounted on said carrier member and movable therewith, a pair of spaced, stationary terminals mounted on said housing means and having contact surface portions extending within said vent chamber, said contact member having an actuated condition completing a circuit between said first and second terminals and an unactuated condition breaking a circuit between said terminals, (vi) means for commonly biasing said valve means toward said valve seat and said contact means toward said contact surface portions;

(c) means for communicating said second port with said low pressure source;

(d) vacuum motor means, said motor means including an output member operably connected to said damper door for moving said door between said open and closed positions;

(e) means for communicating said first port with said vacuum motor means, such that upon communication of said vacuum source thereto said vacuum motor means output member moves said shut-off door to said closed position and upon atmospheric venting of said first port said vacuum motor means moves said door to said open position; and (f) circuit means for connecting said electrical power source to said blower means, said switch means connected along said circuit means intermediate said electrical power source and said blower means, such that as said carrier member is in said first position, said switch means is in said open position and said blower means is de-energized and as said carrier member is in said second position said switch means is in said closed position and said blower means is energized.

25. A temperature responsive control system comprising:

(a) a fluid pressure actuated servomotor for affecting movement of a member to be controlled upon said servo-motor being supplied with a source of pressurized fluid;

(b) an electrically energizable means operative upon connection to a source of electrical power to perform a control function;

(c) thermally responsive valve means including (i) temperature responsive sensing means operative upon sensing a predetermined temperature to provide movement of an actuator member;

(ii) an actuatable switch means electrically in series circuit with said electrically energizable means and a source of electrical power, said switch means including a control member slidably movable between a position making and a position breaking the electrical circuit between said power source and said electrically energizable means;

(iii) housing means defining a vent chamber having a generally flat wall portion with first and second spaced fluid ports provided therein, with said first port in fluid communication with said servomotor and said second ports in fluid communication with said source of fluid pressure;

(iv) a carrier member disposed in said vent chamber and operably movable a direction parallel to said flat wall portion, (v) sealing means disposed for movement with said carrier member, said sealing means defining a sealing surface in sliding contact with said flat wall portion, said sealing surface defining in cooperation with said flat wall portion a valving chamber, said valving chamber being operative in a first position of said carrier member to permit fluid communication between said first and second port and to isolate said ports from said vent chamber and operative in a second position of said carrier member to permit said first port to communicate with said vent chamber and isolate said second port from said first port and said vent chamber, (vi) means biasing said sealing means and said contact member in a direction transverse with respect to the direction of motion of said carrier member, wherein said contact member is slidably moved in the direction of motion of said carrier member and said actuator member is operative to effect movement of said carrier member and said contact member between their respective first and second positions upon said sensing means experiencing temperatures above said predetermined level.

26. The system defined in claim 23, wherein said bias means is common to said sealing means and said contact member.

27. A system for controlling ambient air flow in a passenger vehicle intake air duct, said vehicle having a fluid cooling system, an air intake duct, a shut-off door positionable in the flow of air through said duct, said door movable between an open and closed position, a low pressure source, and an electrical power source, said system comprising: source, and an electrical power source, said system comprising:

(a) blower means for forcing ambient air to said air duct;

(b) relay means, said relay means including (i) housing means, said housing means having structure defining a vent chamber having an internal wall portion in fluid communication with said vent chamber, said internal wall portion defining a valve seat, a first fluid port in fluid communication with said vent chamber and opening into said wall portion, a second fluid port in fluid communication with said vent chamber and opening into said wall portion, said first fluid port being disposed in spaced arrangement from said second fluid port, and means for venting said vent chamber to the atmosphere, (ii) a carrier member received in said vent chamber and movable between a first and second position, (iii) thermally responsive actuator means associated with said housing means and operative to move said carrier member from said first to said second position, said actuator means having a temperature sensitive portion in heat transfer relationship with said fluid cooling system, (iv) valve means operably connected to said carrier member and movable therewith, said valve means including a member having resilient valve surface portions defining in cooperation with said internal wall portion a movable valve chamber therebetween, wherein said first and second fluid ports are spaced such that upon movement of said carrier to said first position said first and second ports are in mutual communication and isolated from said vent chamber and in said second position said first port communicates with said vent chamber and said second port is isolated from said first port and said vent chamber, (v) electrical switch means, said switch means including contact means mounted on said carrier member and movable therewith, a pair of spaced stationary terminals mounted on said housing means and having contact surface portions extending within said vent chamber, said contact member having an actuated condition completing a circuit between said first and second terminals and an unactuated condition for breaking a circuit between said terminals, (vi) means for commonly biasing valve means toward said valve seat and said contact means toward said contact surface portions;

(c) means for communicating said second port with said low port pressure source;

(d) a shut-off door positionable in said air duct and movable between an open position permitting air flow through said duct and a closed position preventing air flow through said duct; vacuum motor means operably connected to said shut-off door for moving same between said open and closed positions;

(e) circuit means for connecting said electrical power source to said blower means for providing power thereto, said switch means connected along said circuit means in series circuit arrangement intermediate said power source and said blower means.

* * * * *